United States Patent Office 2,835,690
Patented May 20, 1958

2,835,690

BASE-CATALYZED ADDITION TO VINYL-SILICON COMPOSITIONS

Maurice Prober, Schenectady, N. Y., assignor to General Electric Company, a corporation of New York No Drawing. Application December 31, 1953
Serial No. 401,703

13 Claims. (Cl. 260—448.2)

This invention relates to a process for the addition of organic compounds containing active hydrogen atoms across the olefinic double bonds of organosilicon compounds containing a vinyl radical attached to silicon through a carbon-silicon linkage in the presence of a basic catalyst.

Carbon-functional organosilicon compounds show promise as intermediates in the preparation of organosilicon oils, gums and resins containing organic and inorganic constituents other than hydrocarbons. By "carbon-functional organosilicon compounds" is meant compounds containing a functional group attached to aliphatic carbon which in turn is attached to silicon through a silicon-carbon bond. Silicone polymers containing these functional groups have properties which vary to a considerable extent from the properties of silicone polymers containing only hydrocarbon radicals. For example, these polymers containing functional groups may vary in resistance to various solvents, may vary in electrical and mechanical properties, and may vary in their heat stability. At the present time organosilicon compounds containing vinyl radicals attached to silicon through carbon-silicon bonds are becoming available and it is desirable to have an inexpensive, efficient method for producing carbon-functional organosilicon compounds from these vinyl compounds.

It has now been discovered that many carbon-functional silicon compounds may be prepared by reacting an organic compound having an active hydrogen atom with a vinyl silane in the presence of a basic catalyst. This reaction takes place under relatively mild reaction conditions and in relatively simple equipment and with good yields.

This invention is applicable to any organic compound having an active hydrogen. Compounds containing active hydrogen consist of the well-known class of compounds having a hydrogen atom which reacts with methylmagnesiumbromide to form methane according to the reaction:

—H+CH₃MgBr→—MgBr+CH₄

Compounds containing reactive hydrogen within the scope of this invention include, for example, alkanols, e. g., methanol, ethanol, propanol, etc.; alkyl mercaptans, e. g., methyl mercaptan, ethyl mercaptan, isobutyl mercaptan, etc.; phenols and alkyl-substituted phenols, e. g., phenol, xylenol, cresol, thymol, carvacrol, etc.; monoalkyl and dialkyl oximes, e. g., aldoxime of acetaldehyde, ketoxime of dimethyl ketone, etc.; dialkyl arsines, e. g., dimethyl arsine, diethyl arsine, methyl ethyl arsine, di-isopropyl arsine, etc.; ammonia, monoalkyl and monoaryl amines, e. g., ethylamine, butylamine, analine, etc.; dialkyl and diaryl amines, e. g., dimethylamine, diethylamine, dibutylamine, n-propyl-n-butylamine, diphenylamine; piperidine, morpholine, etc.; dialkyl phosphines, e. g., dimethyl phosphine, diethyl phosphine, dibutyl phosphine, etc.

The vinyl-substituted organosilicon compounds which may be used in the practice of the present invention are of the general formula:

(1)         $(CH_2=CH)_n Si(R)_{4-n}$ where $n$ is an integer equal to from 1 to 3, inclusive, and R is the same or different member selected from the class consisting of alkyl radicals, e. g., methyl, ethyl, propyl, butyl, etc., radicals; aryl radicals, e. g., phenyl, tolyl, etc., radicals; aryloxy radicals, e. g., phenoxy, diphenoxy, etc., radicals; alkoxy radicals, e. g., methoxy, ethoxy, propoxy, etc., radicals; acyloxy radicals, e. g., acetoxy, etc., radicals; organosiloxy radicals, e. g., trimethylsiloxy, triphenylsiloxy, pentamethyldisiloxy, etc., radicals.

The vinyl-substituted silanes and siloxanes employed in the practice of the present process may be prepared, for example, by the method shown in U. S. Patent 2,420,912—Hurd. Possible methods for preparation of these compounds include, for example, the reaction of a vinyl halide with heated silicon in the presence of a copper catalyst, or the chlorination of alkyl-substituted silanes with the subsequent dehydrochlorination of the alkyl radical. The vinyl-substituted polysiloxanes used in the present invention may be prepared by the method disclosed in U. S. Patent 2,645,628—Hurd. For example, vinyl-substituted silanes containing a hydrolyzable group such as halogen or alkoxy or aryloxy radicals attached to silicon may be hydrolyzed to from siloxane linkages.

Vinyl-substituted organosilicon compounds within the scope of Formula 1 include, for example, vinyltriethoxysilane, vinyltrimethoxysilane, methylvinyldiethoxysilane, phenylvinyldiethoxysilane, vinylpentamethyldisiloxane, 1,3-divinyltetramethyldisiloxane, etc.

Products which may be formed by the addition of compounds having an active hydrogen to compounds of Formula 1 include for example, $C_2H_5OCH_2CH_2Si(OC_2H_5)_3$
$C_2H_5SCH_2CH_2Si(OC_2H_5)_3$
$(C_3H_7)_2NCH_2CH_2Si(OC_2H_5)_3$
$C_2H_5OCH_2CH_2Si(CH_3)(OC_2H_5)_2$
$C_2H_5SCH_2CH_2Si(C_6H_5)(OC_2H_5)_2$
$C_4H_9SCH_2CH_2(CH_3)_2SiOSi(CH_3)_3$
$C_4H_9SCH_2CH_2(CH_3)_2SiOSi(CH_3)_2CH_2CH_2SC_4H_9$
$C_2H_5OCH_2CH_2CH_2(CH_3)_2SiOSi(CH_3)_3$ The addition reaction of the present invention has been found to proceed only in the presence of a basic catalyst. For example, when an alcohol is heated with vinyltriethoxysilane in the absence of a catalyst, there is no addition of the alcohol across the double bond of the vinyl radical. However, as soon as a basic catalyst is added the reaction takes place. The rate of reaction depends on the basicity of the reaction solution. The solution may be made to vary in basicity because of the particular basic catalyst used or because of the concentration of the catalyst used. In general, it has been found that best results are obtained when the catalyst is completely soluble in the reaction mixture. However, the reaction proceeds to some extent when the basic catalyst is only slightly soluble in the reaction mixture. Suitable basic catalysts for the practice of this invention have been found to be those highly basic compounds which are at least slightly soluble in the reaction mixture. These basic catalysts include, for example, alcoholates, e. g., sodium methylate, sodium ethylate, lithium ethylate, etc.; mercaptides, e. g., sodium ethyl mercaptide, sodium methyl mercaptide, sodium butyl mercaptide, etc., and sodamide.

The present reaction is carried out by heating together the active hydrogen compound, the vinyl-substituted organosilicon compound, and the basic catalyst. The reaction may be effected advantageously by refluxing the reactants and catalysts in a suitable reaction vessel and reflux column at atmospheric pressure. The reflux temperature will, of course, vary with the particular reactants involved. However, in general, the reaction temperatures vary from about 50 to 150° C. at the beginning of the reaction and from about 100 to 200° C. at the end of the reaction. The concentration of catalysts may vary within wide limits, for example, from about 0.5% to 15% based on the weight of the vinyl-substituted organosilicon compound. The choice of catalyst concentration depends on the economics of the reaction, considering both the cost of the catalyst and the fact that an increased catalyst concentration leads to greater yields. Preferably, I use from about 1% to 11% catalyst, based on the weight of the vinyl-substituted organosilicon compound. The ratio of active hydrogen compound to vinyl-substituted organosilicon compound is not critical and may vary from about 0.25 mole to about 5 moles of active hydrogen compound per mole of vinyl radical. Preferably, a molar ratio of about 1:1 of the active hydrogen compound to each vinyl substituent on the organosilicon compound is used.

The following examples are illustrative of the practice of my invention and are not intended for purposes of limitation.

Example 1

A solution of 0.02 mole of sodium ethoxide in 9.2 grams of absolute ethanol (prepared by adding 0.46 gram of sodium to 10.1 grams of ethanol) was added to 36.8 grams of vinyltriethoxysilane and the solution was refluxed for 69 hours. After the reaction had been completed, the reaction mixture was fractionally distilled to give 9.7 grams of β-ethoxyethyltriethoxysilane which boiled at 125–126° C. at 41 mm. and had a refractive index $n_D^{20}$ 1.4057. Analysis of this product showed it to contain 51.4% carbon, 9.9% hydrogen. (Theoretical: 50.81% carbon and 10.23% hydrogen.)

Example 2

4.31 grams (0.188 mole) of sodium was added to a solution of 43.2 grams (0.938 mole) of ethanol and 145.0 grams (0.750 mole) of vinyltriethoxysilane. The solution was heated at reflux for 168 hours, during which time the pot temperature rose to 118° C. Toluene was added to precipitate the sodium ethoxide and the solution was centrifuged. The remaining solution was then fractionally distilled to yield 32.9 grams of vinyltriethoxysilane, and 70.1 grams of β-ethoxyethyltriethoxysilane which boiled at 113–114.5° C. at 31 mm. had a density $d_4^{20}$ 0.931, a refractive index $n_D^{20}$ 1.4053, and a molar refractivity $MR_D$ 62.27. (Theoretical $MR_D$: 62.26.) Chemical analysis of the product showed it to contain 50.8% carbon and 10.5% hydrogen as compared with the theoretical values of 50.81% carbon and 10.23% hydrogen.

Example 3

79.7 grams (0.787 mole) di-n-propylamine, 145.0 grams (0.75 mole) vinyltriethoxysilane and 1.46 gram (0.037 mole) of commercial grade sodium amide were refluxed for 168 hours, during which time the reaction temperature rose to about 136° C. A solid product which formed during the reaction was centrifuged out and the solid was washed with benzene. The benzene washing and liquid from the reaction was rectified to obtain 102.0 grams vinyltriethoxysilane, and 15.1 grams of $(C_3H_7)_2NCH_2CH_2Si(OC_2H_5)_3$ which boiled at 78° C. at 0.5 mm. and had a refractive index $n_D^{20}$ 1.4239. Chemical analysis of the $(C_3H_7)_2NCH_2CH_2Si(OC_2H_5)_3$ showed the compound to contain 58.0% carbon, 11.6% hydrogen and 5.1% nitrogen. (Theoretical: 57.68% carbon, 11.41% hydrogen, 4.81% nitrogen.)

Example 4

1.15 grams (0.05 mole) of sodium was dissolved in 49.6 grams (0.55 mole) of n-butyl mercaptan and 95.2 grams (0.50 mole) of vinyltriethoxysilane, and the solution was refluxed for 168 hours. During this time the reaction temperature rose from 118 to 126° C. After the reaction had taken place, benzene was added and a solid which had formed on addition of the benzene was centrifuged off and the resulting solution was rectified. This rectification yielded 36.3 grams of vinyltriethoxysilane and 48.8 grams of

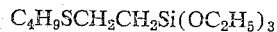

having a density $d_4^{20}$ 0.952 and a refractive index $n_D^{20}$ 1.4422. The $MR_D$ was observed to be 77.91 as compared with the theoretical value of 77.54. Chemical analysis of the product showed it to contain 51.2% carbon, 10.3% hydrogen, 11.7% sulfur and 9.9% silicon as compared with the theoretical values of 51.38% carbon, 10.06% hydrogen, 11.43% sulfur and 10.01% silicon.

Example 5

5.75 grams (0.25 mole) sodium was dissolved in 57.5 grams (1.25 mole) absolute ethanol and 160.0 grams (1.00 mole) of methylvinyldiethoxysilane was added. The solution was refluxed for 42 hours during which time the reaction temperature rose to 106° C. Benzene was added to the reaction mixture and a solid which formed on addition of the benzene was centrifuged off and the solution was fractionally distilled to yield 90.1 grams methylvinyldiethoxysilane, and 39.1 grams β-ethoxyethylmethyldiethoxysilane which had a boiling point of 100–101° C. at 48 mm. and a refractive index $n_D^{20}$ 1.4080. Chemical analysis of the product showed it to contain 52.6% carbon and 11.1% hydrogen. (Theoretical: 52.4% carbon, 10.7% hydrogen.)

The products prepared in accordance with the process of the present invention are useful in the preparation of organopolysiloxane oils, resins and gums, which may be used in lubricants, coating materials and molded products.

What I claim as new and desire to secure by Letters Patent of the United States is:

1. The process of adding an active hydrogen compound selected from the class consisting of alkanols, ammonia, monoalkyl amines, dialkyl amines, monoaryl amines, diaryl amines, alkyl mercaptans, phenol, alkyl-substituted phenol, alkyloximes, dialkyl oximes, dialkyl arsines, and dialkyl phosphines to vinyl-substituted organosilicon compounds which process comprises effecting reaction between said active hydrogen compound and a silicon-bonded vinyl-substituted organosilicon compound in the presence of a basic catalyst selected from the class consisting of alcoholates, mercaptides and sodamide.

2. The process of adding an active hydrogen compound selected from the class consisting of alkanols, ammonia, monoalkyl amines, dialkyl amines, monoaryl amines, diaryl amines, alkyl mercaptans, phenol, alkyl-substituted phenol, alkyl oximes, dialkyl oximes, dialkyl arsines, and dialkyl phosphines to vinyl-substituted organosilicon compounds which process comprises effecting reaction in the presence of a basic catalyst selected from the class consisting of alcoholates, mercaptides and sodamide between (1) said active hydrogen compound and (2) organosilicon compound of the formula:

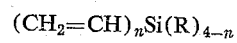

where $n$ is an integer equal to from 1 to 3, inclusive, and the various R's are members selected from the class consisting of alkyl radicals, aryl radicals, aryloxy radicals, alkoxy radicals, acyloxy radicals, and organosiloxy radicals.

3. The process of preparing β-ethoxyethyltriethoxysilane which process comprises effecting reaction between ethanol and vinyltriethoxysilane in the presence of sodium ethoxide.

4. The process of preparing $$(C_3H_7)_2NCH_2CH_2Si(OC_2H_5)_3$$

which process comprises effecting reaction between di-n-propyl amine and vinyltriethoxysilane in the presence of catalytic amounts of sodium amide.

5. The process of preparing $$C_4H_9SCH_2CH_2Si(OC_2H_5)_3$$

which process comprises effecting reaction between n-butyl mercaptan and vinyltriethoxysilane in the presence of catalytic amounts of sodium butyl mercaptide.

6. The process of preparing β-ethoxyethylmethyldiethoxysilane which process comprises effecting reaction between ethanol and vinylmethldiethoxysilane in the presence of catalytic amounts of sodium ethoxide.

7. The process of claim 1 in which the active hydrogen compound is an alkanol.

8. The process of claim 1 in which the active hydrogen compound is an alkyl mercaptan.

9. The process of claim 1 in which the active hydrogen compound is ammonia.

10. The process of claim 1 in which the active hydrogen compound is a dialkyl amine.

11. The process of claim 1 in which the basic catalyst is an alcoholate.

12. The process of claim 1 in which the basic catalyst is a mercaptide.

13. The process of claim 1 in which the basic catalyst is sodamide.

References Cited in the file of this patent

UNITED STATES PATENTS 2,479,374    Krieble _____ Aug. 16, 1949

FOREIGN PATENTS 1,118,495    France _____ Mar. 19, 1956